US009460354B2

(12) United States Patent
Fernandez et al.

(10) Patent No.: US 9,460,354 B2
(45) Date of Patent: Oct. 4, 2016

(54) OBJECT DETECTION

(71) Applicant: ANALOG DEVICES TECHNOLOGY, Hamilton (BM)

(72) Inventors: Joseph Fernandez, Karnataka (IN); Sreenath Kottekkode, Karnataka (IN)

(73) Assignee: Analog Devices Global, Hamilton (BM)

( * ) Notice: Subject to any disclaimer, the term of this patent is extended or adjusted under 35 U.S.C. 154(b) by 365 days.

(21) Appl. No.: 13/888,993

(22) Filed: May 7, 2013

(65) Prior Publication Data

US 2014/0133698 A1 May 15, 2014

Related U.S. Application Data

(60) Provisional application No. 61/724,867, filed on Nov. 9, 2012, provisional application No. 61/810,047, filed on Apr. 9, 2013.

(51) Int. Cl.

| *G06K 9/00* | (2006.01) |
| *G06K 9/46* | (2006.01) |
| *G06K 9/66* | (2006.01) |
| *G06K 9/62* | (2006.01) |
| *H04N 7/18* | (2006.01) |

(52) U.S. Cl.
CPC ....... *G06K 9/00805* (2013.01); *G06K 9/00791* (2013.01); *G06K 9/4642* (2013.01); *G06K 9/6269* (2013.01)

(58) Field of Classification Search
None
See application file for complete search history.

(56) References Cited

U.S. PATENT DOCUMENTS

| 7,561,720 | B2 | 7/2009 | Miyahara |
| 7,570,198 | B2 | 8/2009 | Tokoro |
| 7,586,400 | B2 * | 9/2009 | Nagaoka ............... B60W 50/14 340/425.5 |
| 7,639,841 | B2 * | 12/2009 | Zhu .................... G06K 9/00335 340/435 |
| 8,379,928 | B2 * | 2/2013 | Kuoch et al. ................. 382/104 |
| 8,649,594 | B1 * | 2/2014 | Hua et al. ...................... 382/159 |
| 2005/0100192 | A1 * | 5/2005 | Fujimura et al. ............. 382/103 |
| 2007/0043491 | A1 * | 2/2007 | Goerick et al. ................. 701/41 |
| 2009/0067675 | A1 | 3/2009 | Tan et al. |
| 2012/0140076 | A1 | 6/2012 | Rosenbaum et al. |
| 2012/0313523 | A1 * | 12/2012 | Futamura et al. .............. 315/79 |
| 2013/0103299 | A1 | 4/2013 | Matsuda et al. |
| 2013/0229525 | A1 * | 9/2013 | Nagaoka ............... G08G 1/163 348/148 |

OTHER PUBLICATIONS

Kanitkar et al., "Vision based Preceding Vehicle Detection Using Self Shadows and Structural Edge Features", Image Information Processing (ICIIP), 2011 International Conference, pp. 1-6, Nov. 3-5, 2011.*

Dalai et al., "Histograms of Oriented Gradients for Human Detection", IEEE Computer Society Conference on Computer Vision and Patter Recognition, 2005, vol. 1, pp. 886-893.*

KR Office Action (Last Preliminary Rejection) issued in KR Patent Application Serial No. 10-2013-0135336 mailed Mar. 22, 2016, 3 pages.

English Summary of KR Office Action (Last Preliminary Rejection) issued in KR Patent Application Serial No. 10-2013-0135336 mailed Mar. 22, 2016, 1 page.

* cited by examiner

*Primary Examiner* — Matthew Bella
*Assistant Examiner* — Jose M Torres
(74) *Attorney, Agent, or Firm* — Patent Capital Group (57) ABSTRACT

Objects are detected in real-time at full VGA 30 frame per second resolution. A preprocessor performs run-length encoding (RLE) and generates a summed area table (SAT) of an image. The RLE and SAT are used to identify candidate objects and to iteratively refine their boundaries. A histogram of gradients (HoG) and support vector machine (SVM) then reliably classify the object. The method may be part of an advanced driver assistance system (ADAS).

19 Claims, 11 Drawing Sheets

OBJECT DETECTION

PRIORITY DATA

This application is a non-provisional of U.S. Provisional Patent Application Ser. No. 61/724,867, filed Nov. 9, 2012 and U.S. Provisional Patent Application Ser. No. 61/810,047, filed Apr. 9, 2013, both of which are hereby incorporated by reference in their entirety.

TECHNICAL FIELD OF THE DISCLOSURE

The present disclosure relates generally to object detection and more particularly to detection of motor vehicles in a video stream for forward collision warning (FCW) systems.

BACKGROUND

Modern vehicles may include advanced driver assistance systems (ADAS). The role of an ADAS may range from merely passively warning a driver of dangers to assuming control of the vehicle in emergency situations to assuming complete autonomous control over the vehicle in desired situations. An ADAS may be a dedicated embedded microcomputer and may provide certain real-time operations, including for example Lane Departure Warning (LDW), Traffic Signal Recognition (TSR), Pedestrian Detection (PD), automated High Beam/Low Beam (HBLB) control, and FCW.

With particular reference to object detection for FCW, it is known in the art to use a histogram of gradients and a support vector machine (SVM) classifier to identify an object such as a car. Histogram of gradients and SVM are highly-reliable, but are also relatively computationally-intensive tasks.

OVERVIEW

The present disclosure provides a method of detecting an object of interest in an image comprising:
  a. receiving the image;
  b. performing run-length encoding on the image to identify edges for a shape bounding a candidate object;
  c. generating a hypothesis that the candidate object is the object of interest;
  d. calculating a histogram of gradients for the candidate object; and
  e. classifying the candidate object as the object of interest using a support vector machine method.

According to an additional embodiment, the method disclosed above may further provide:
  a. computing a summed area table for a second image, the second image containing the candidate object of the first image, the candidate object having associated with it a shape bounding the candidate object;
  b. dividing the shape into discrete regions and using the summed area table to test for symmetry between regions; and
  c. applying a Haar template to the shape to identify at least one corner.

According to yet another embodiment, the present disclosure provides a computer for detecting objects of interest comprising:
  a. a processor;
  b. a camera; and
  c. a memory having stored there software instructions that, when executed, are configured to instruct the processor to:
    i. receive a first image from the camera;
    ii. compute a run-length encoding of the first image;
    iii. use the run-length encoding to detect edges of a candidate object;
    iv. receive a second image from the camera, the second image representing a previous state of the first image and including the candidate object;
    v. calculate a summed area table of the second image;
    vi. use the summed area table to refine detected edges of the candidate object; and
    vii. verify that the candidate object is the object of interest using a histogram of gradients and a support vector machine authorization.

According to yet another embodiment, the present disclosure provides an advanced driver assistance system comprising:
  a. a camera configured to visual data from a surrounding environment and to provide a video stream having a resolution of at least 640×480 pixels at 30 frames per second;
  b. a computer configured to receive the video stream and to process at least 30 frames per second at 640×480-pixel resolution in real time, wherein processing the stream comprises identifying a dangerously-proximate object in the video stream while consuming no more than 250 million instructions per second.

DESCRIPTION OF THE DISCLOSURE

While drawn generally to automated object detection by a computer, the present specification is best understood in relation to a concrete embodiment disclosed herein and shown in the figures, relating particularly to FCW. The embodiment disclosed herein is adapted to provide real-time FCW at full video graphics array (VGA) resolution of 640×480 pixels and 30 frames per second (fps) while consuming no more than 250 millions of instructions per second (MIPS) on a digital signal processor (DSP), microprocessor, microcontroller, or similar. This permits real-time full-scale VGA detection on a single dual-core DSP such as the Analog Devices, Inc. (ADI) "Blackfin" BF609 dual-core processor running at approximately 500 MHz. This DSP includes a pipelined vision processor, which is a set of functional hardware blocks next to the DSP cores designed to perform basic image processing.

The FCW method of the exemplary embodiment is two-pronged: one prong based on a Sobel edge map and subsequent run length encoding (RLE) analysis, and the second path based on summed area table (SAT) analysis. In the exemplary embodiment, the two paths (the RLE based path and the SAT based path) are independent of one another. The independent pathways ensure that if the edge map is adversely affected (for example, resulting from shadows or other environmental conditions), such that the RLE based path is affected, the SAT based path can still provide reliable detection.

In the exemplary embodiment, VGA FCW processing is performed on average at about 110 MIPS with a peak of about 249 MIPS. In an example, the RLE based pathway (for example, the RLE based hypothesis generation) can additionally be used to detect vehicle lights, for example, for automatic headlamp control.

In contrast to conventional vehicle detection methods, the disclosed detection method employs symmetry, corner, and shadow detection discretely and optimally. For example, simple Haar features are implemented to achieve corner detection, thereby reducing MIPS. Further, the symmetry, corner, and shadow detection features are performed on vehicle(s) in the previous image frame, instead of possible vehicle(s) in the current frame, thereby providing deterministic MIPS.

The disclosed vehicle detection method refrains from using all detection features at all stages, instead implementing a discretional cascade of relevant detection features. For example, the disclosed vehicle detection method uses:

symmetry to detect left side and right side of the vehicle;
corner to recalculate bottom, left, and right sides of the vehicle;
shadow and road intensities to recalculate the bottom side of the vehicle and
segments derived from an RLE of an edge map to readjust the top side of the vehicle.

Turning now to the included figures, an exemplary embodiment of an object detection method and system is disclosed in more detail. In accordance with standard practices, various features are not drawn to scale and are used for illustration purposes only.

Figure 1:
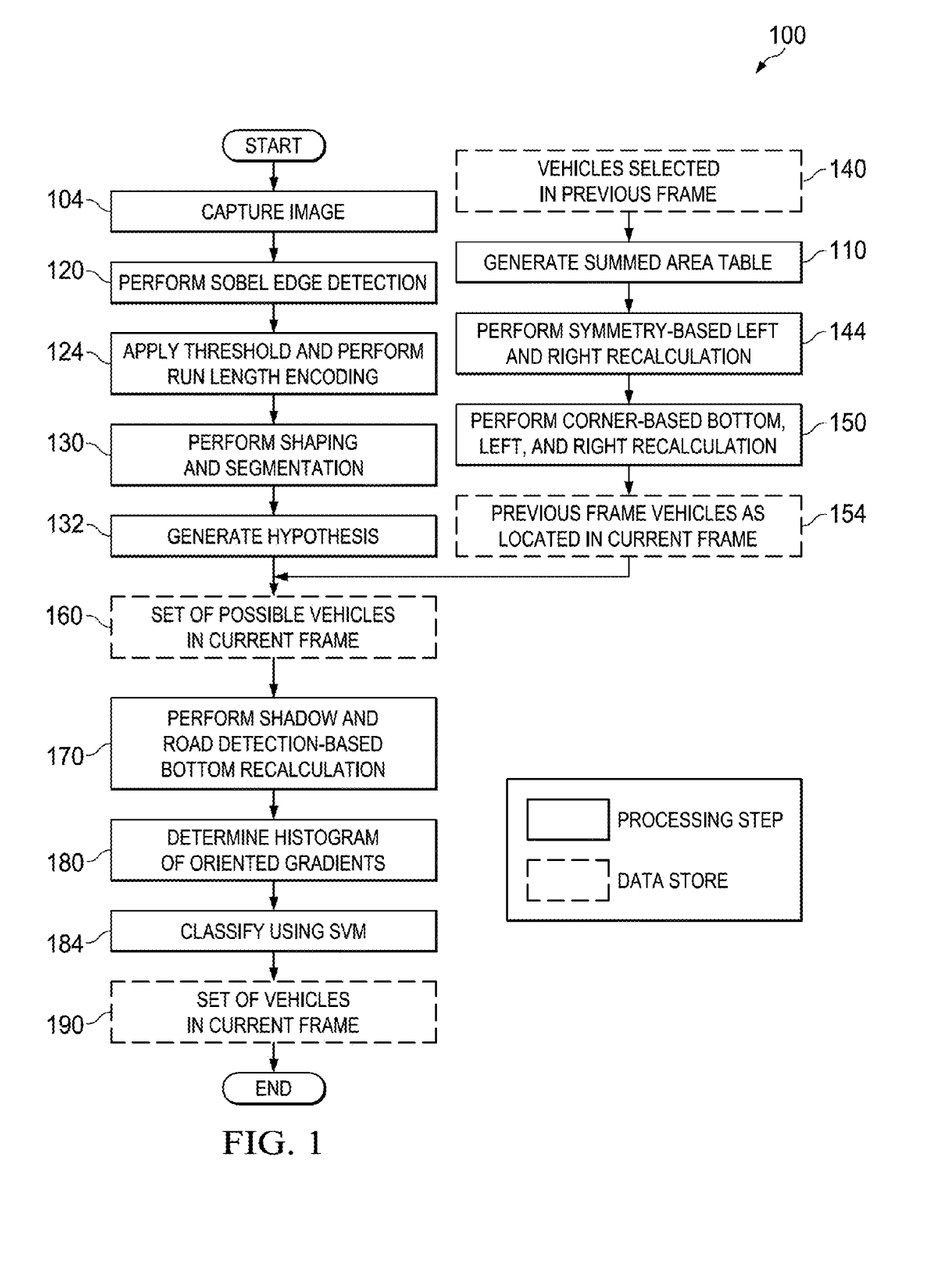
FIG. 1 is a flow chart of an exemplary method of object detection.

FIG. 1 is a flow diagram of an exemplary method 100 of detecting one or more objects of interest, such as vehicles, in a frame of a video stream. Vehicle detection is useful as a concrete example because a core task in FCW is detecting a "nearest" vehicle, which may represent a collision danger. For example, FIG. 6 discloses an image 600 of an exemplary road scene, which may be taken, for example, from a video stream of an onboard-camera of an ADAS-equipped vehicle (not shown). Image 600 includes three cars, 610, 630, and 640, all on road 620. Vehicle 610 is closest to and is in the same lane 622 as the ADAS-equipped car, thus representing the most proximate collision danger. Car 640 is further away and is in a parallel lane, thus representing a lesser collision danger. Car 630 is approximately as close as car 610, but is in a parallel lane, and thus also represents a lesser collision danger. Complications in successfully identifying car 610 may include trees 660 and poles 650 appearing as false edges of car 610, and differentiating car 610 from road 620 and shadow 612. A successful FCW event may include detecting that car 610 is a car, separate from road 620, shadow 612, poles 650, and trees 660, and that car 610 is unsafely proximate. In response to the detection, the FCW system may take an appropriate action such as warning the driver or applying brakes.

As noted above, vehicle 610 can be detected relatively reliably with a histogram of gradients and SVM classification (HoG/SVM) method. But performing HoG/SVM on a full-VGA field of 640×480 pixels at 30 fps is prohibitively computationally-intensive, and thus may not be practicable on an embedded processor such as a Blackfin BF609, particularly when the processor is also required to perform LDW, TSR, PD, and HBLB in real time. Absent the method of FIG. 1, options for real-time processing on a DSP may include, for example, undersampling the image at 15 fps, or using a preprocessor to compress the resolution to 320×240 pixels. Such techniques, however, result in lower reliability. Another option is to use additional cores or processors, thus incurring penalties of additional cost or complexity, as well as the opportunity cost of additional benefits gained from adding cores or processors. For example, additional cores or processors may be used to enable real-time processing of high-definition images at 1280×920 pixels. Thus, FIG. 1 discloses a method 100 of object detection in which HoG/SVM is performed only on a selected subset of the pixels in an image, whereby fewer processor cycles are consumed by the FCW routine, enabling real-time detection at full-VGA resolution at 30 fps on a single dual-core processor, or real-time detection at 1280×960 resolution at 30 fps on a two-dual-core processor configuration—all in addition to reliable LDW, TSR, PD, and HBLB.

Returning to FIG. 1, according to method 100, an image is captured at block 104. In the exemplary method, the captured image includes an object of interest to be detected, such as a nearest vehicle. In block 120, the prior art Sobel edge detection method is performed on the image. The Sobel operator calculates an approximation of the gradient of image intensity without respect to intensity, or in other words, the Sobel operator calculates at each point a vector representing the rate of change of intensity at that point, as well as the direction of the change. A sharper intensity gradient (or stated otherwise, a more abrupt change in brightness) is more likely to represent an edge. Similarly, a sharp vertical gradient is more likely to represent a horizontal edge, while a sharp horizontal gradient is more likely to represent a vertical edge.

Figure 7:
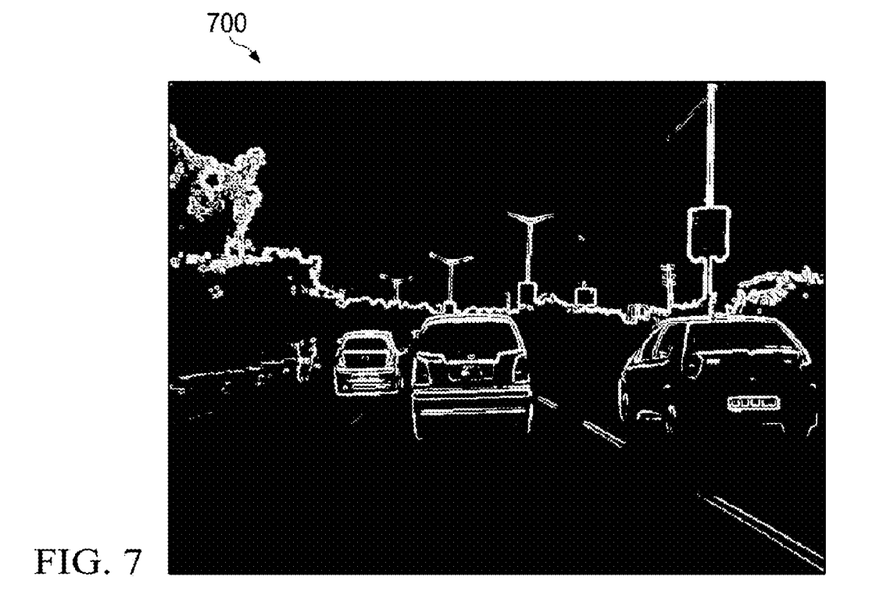
FIG. 7 is an example graphical view of a run-length encoding plot.

In block 124, the output of Sobel edge detection 120 is used to perform run-length encoding (RLE). RLE is a method wherein "runs" of similar or identical pixels are encoded as a run length and value. For example, in an exemplary black and white image where "B" represents black and "W" represents white, 50 consecutive black pixels would be run-length encoded as "50B." In this method, the Sobel Edge Polar Magnitude is subjected to a threshold; values below the threshold are assigned to 0; those greater than the threshold are assigned to 1. Then run-lengths of 1 are encoded and used in the subsequent shaping stage. Those having skill in the art will recognize that variations of this method are also possible, for example, grouping pixels falling within a certain variance of one another, or repeating patterns of pixels (for example, 50 occurrences of the pattern "BBWW" may be encoded as "50BBWW"). The RLE operation may yield a high-contrast RLE plot such as RLE plot 700 (FIG. 7).

Figure 8:
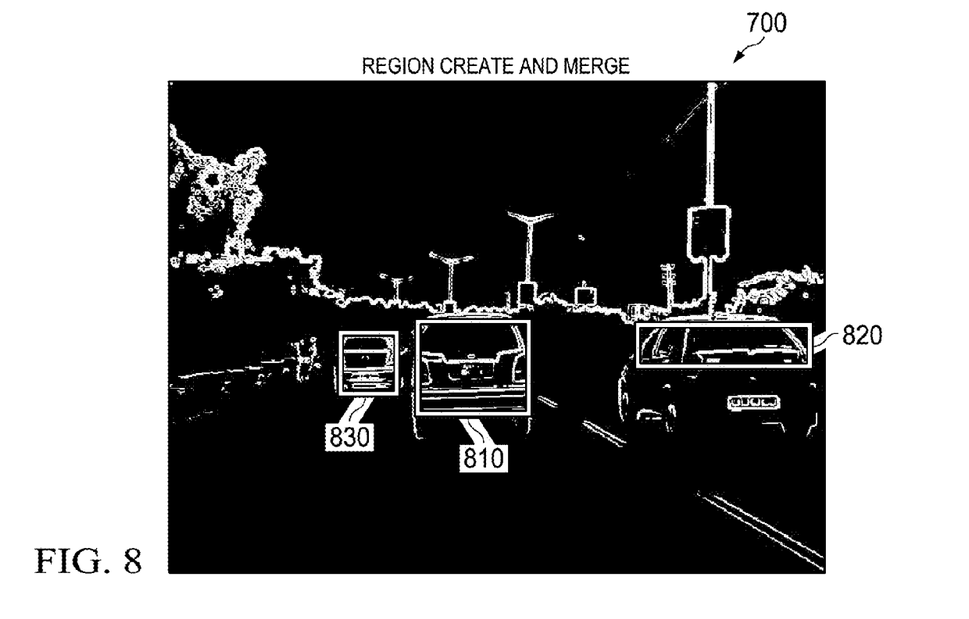
FIG. 8 is an example of region creation on a run-length encoding plot.

In block 130, a process of shaping and segmentation is performed to further refine shapes defined in RLE plot 700. For example, FIG. 8 discloses three regions of interest (ROI) identified from RLE plot 700 (FIG. 7), each being substantially rectangular, namely objects 810, 820, 830. Object 810 is, in the exemplary embodiment, an object that may be a forward collision danger. Thus, it is beneficial to more precisely refine the area bounding object 810. In some cases, shaping and segmentation may be minimal so as not to consume excessive processing power.

In block 132, a hypothesis is formed as to how many vehicles are in the present frame. In block 160, a set of possible vehicles in the current frame is provided.

Advantageously, where the disclosed vehicle detection method includes the RLE based pathway, the RLE of the image is inherently more reliable since unambiguous positions are available. However, RLE is often not used in real-time processing because it may be processor-intensive. As noted above, the present disclosure implements the disclosed vehicle detection method in a DSP, such as the Blackfin 609 DSP by Analog Devices, Inc., which enables offloading the RLE generation to a PVP video preprocessor.

In a separate branch of FIG. 1, in block 110, a summed area table (SAT) is produced for a prior image, for example an image that was processed according to the block 120 branch in a previous iteration. The methods in the block 110 branch are provided to refine the hypothesis. The SAT operation divides the image into a plurality of discrete squares, each of which is uniform in size in the exemplary embodiment, and each of which has a characteristic intensity, which may be either the intensity of an individual pixel, or for blocks larger than one square pixel, may be a sum of intensities of the constituent pixels.

The SAT operation starts at the first block, and then proceeds across the entire image in an orderly fashion, recording for each block the sum of the intensity of that block and the value recorded for the previous block. Thus, the SAT records for each block the running sum of all intensities up to and including that block. The SAT is produced only once for each image, and greatly simplifies calculating sums for other operations. For example, a rectangular area bounded by sides (starting from the upper left and moving clockwise) A, B, C, D has an intensity sum of A+D−(B+C). Because intensity sums for A, B, C, and D are already recorded in the SAT, calculating the sum of an arbitrarily large rectangular area involves only three discrete operations.

In block 140, an image is provided, including vehicles or other candidate objects identified in a previous frame. In block 144, a symmetry check is performed to refine detection of left and right sides. This is useful for detecting vehicles because almost all motor vehicles are essentially symmetrical along a vertical axis when viewed from behind. Since all vehicles in the frame may not be viewed directly from behind, symmetry analysis may be accorded lesser priority than corner detection.

Figure 4:
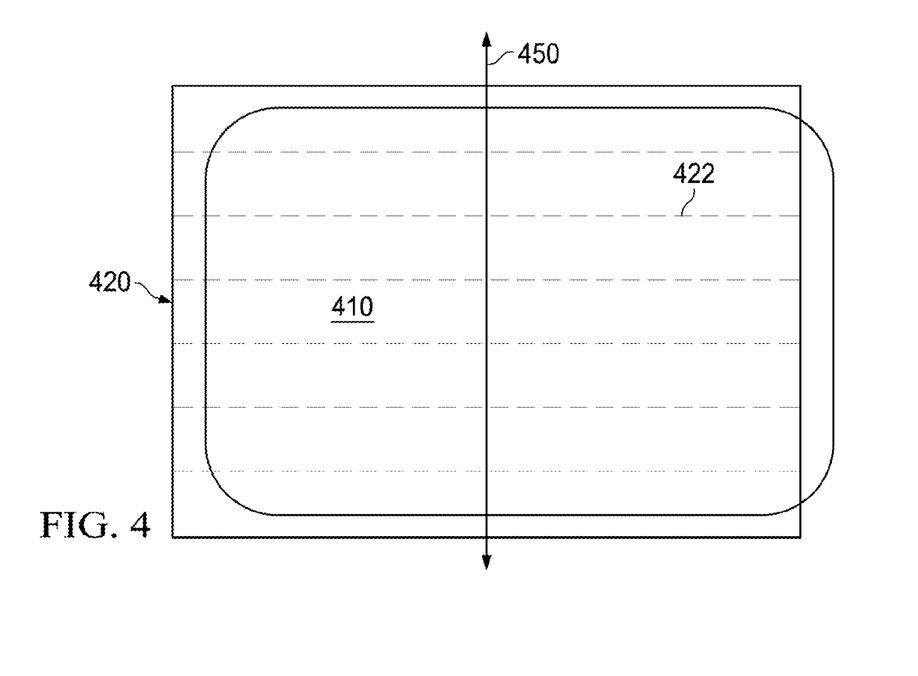
FIG. 4 is a block diagram view of a generalized symmetry method.
Figure 9:
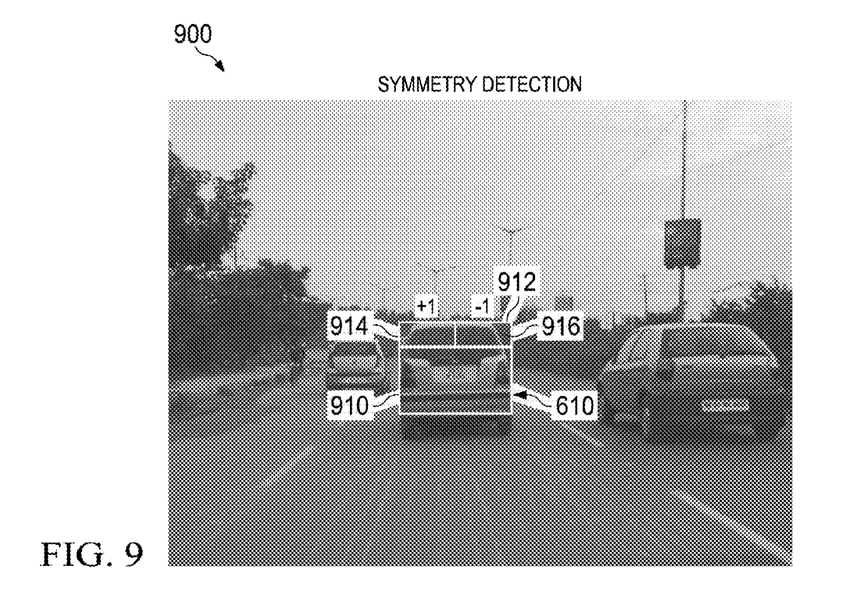
FIG. 9 is an example of symmetry processing on the image of FIG. 6.

FIG. 4 discloses a generic version of an object undergoing the symmetry process of block 144. In FIG. 4, a candidate object of interest 410 has been identified. RLE processing from a previous stage has yielded an approximate shape 420, which in this example is slightly larger than object 410 and which is also off center. Shape 420 is divided into a plurality of segments 422. Segmentation is useful to avoid false positives for symmetry. For example, a feature in the lower left corner of object 410 may offset a feature in the upper right corner of object 410, thus creating a false vertical symmetry. Symmetry processing is further illustrated in FIG. 9, in which image 900 shows vehicle 610 have regions 910, 914, and 916. Regions 914 and 916 form region 912, which has substantial vertical symmetry.

Figure 2:
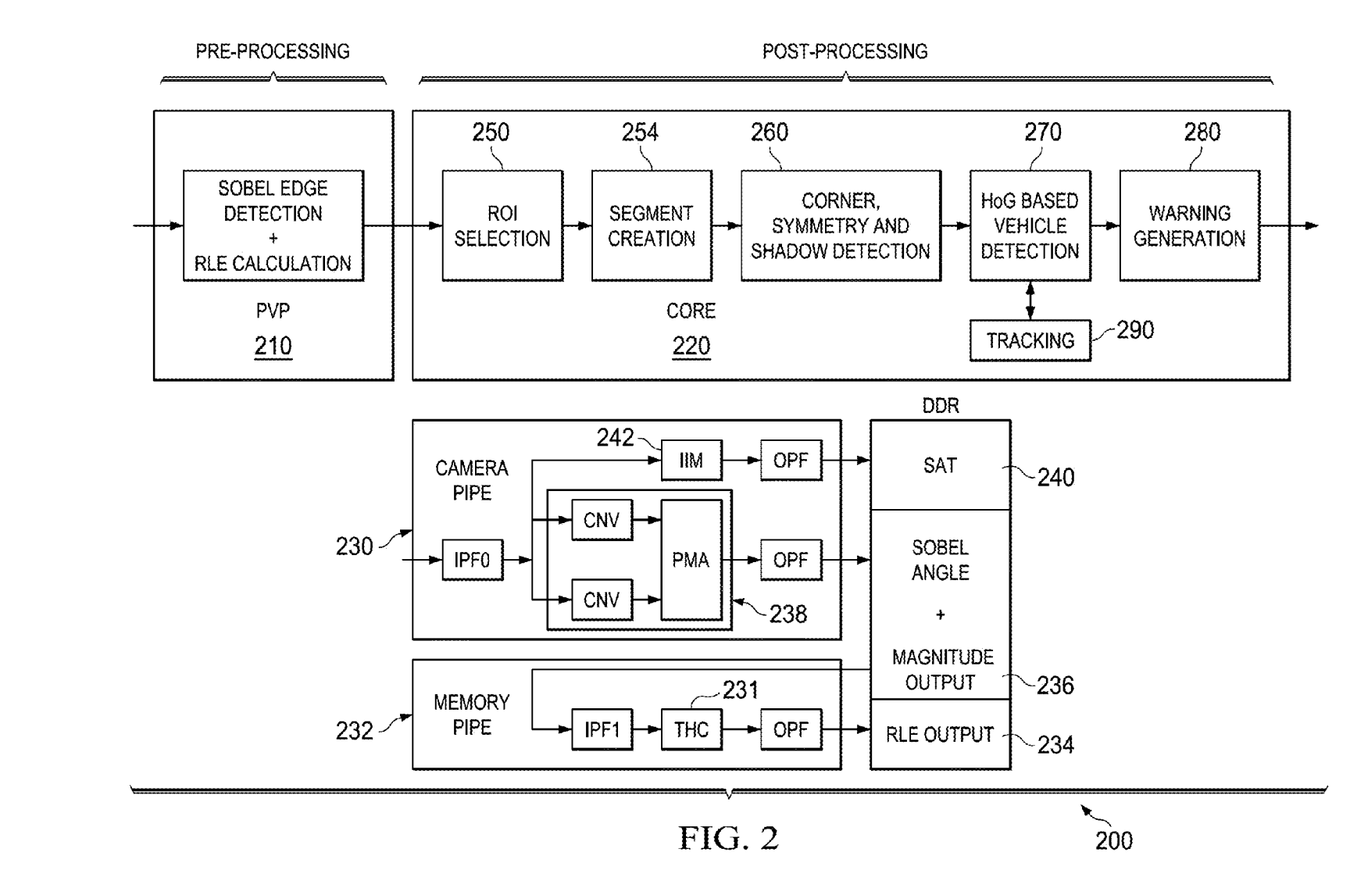
FIG. 2 is a functional block diagram of a generalized object detection computer.
Figure 4A:
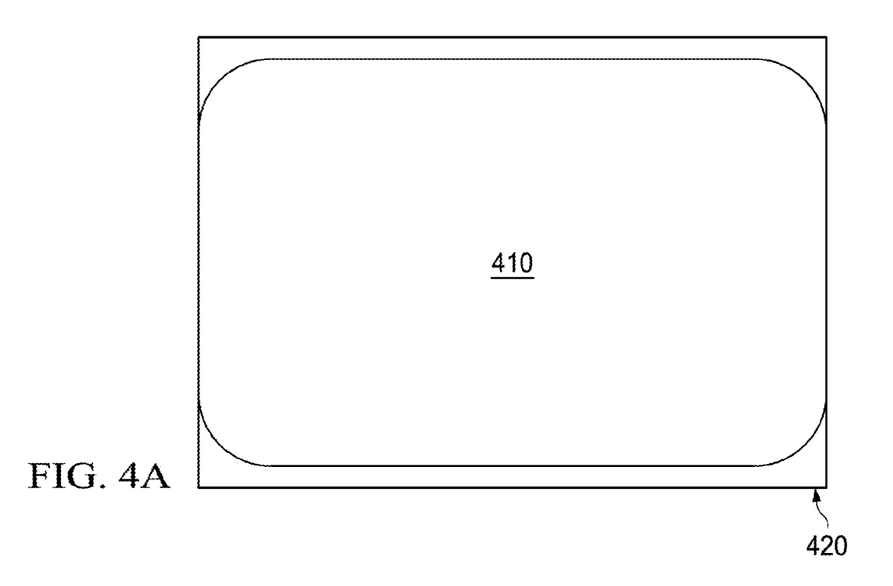
FIG. 4A is a block diagram of an object after a symmetry method.

After object 420 is divided into segments 422, a vertical axis 450 is established through the center of shape 420. Intensity sums are taken for both the left side (A) and the right side (B) of segment 422. A difference of these sums is then computed (A−B). The sum is not processor intensive because it is based on SAT 240 (FIG. 2). Shape 420 is then slid left and right, and contracted and expanded horizontally. With each change, additional differences of sums are taken. In an ideal image, the two sides of object 410 are exactly symmetrical, and the difference of the sums will be exactly zero when shape 420 is centered on object 410 and equal in width. In a practical application, shape 420 is centered on object 410 when the difference is at a minimum, as shown in FIG. 4A.

Figure 6:
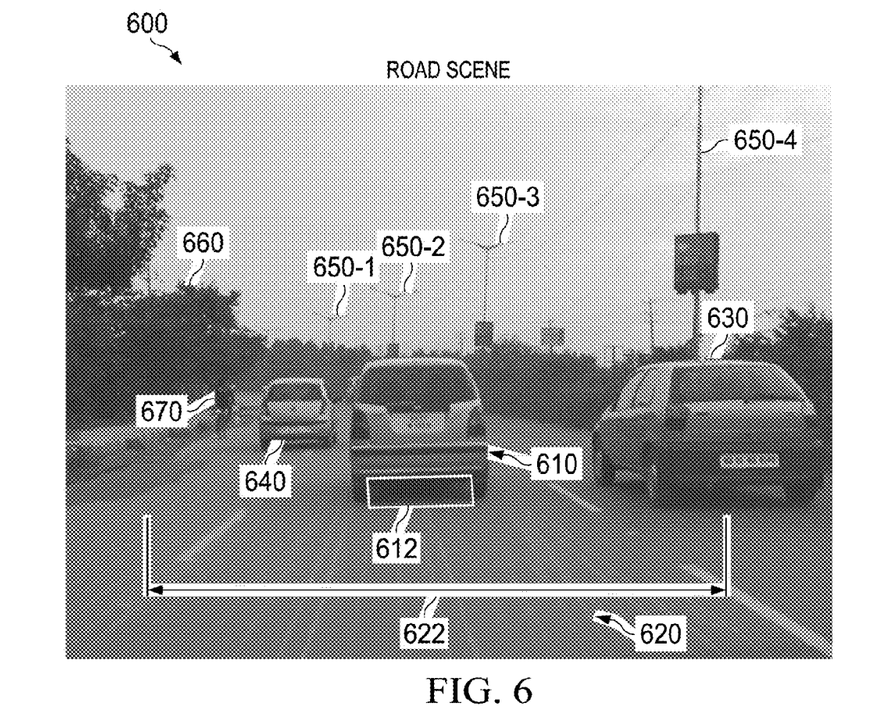
FIG. 6 is an exemplary image taken from a video stream.
Figure 10:
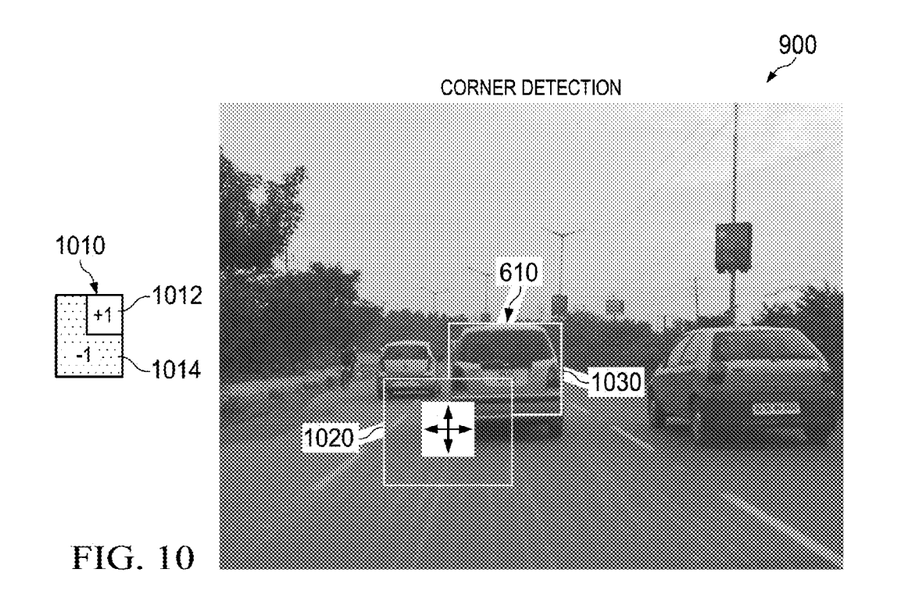
FIG. 10 is an example of corner detection on the image of FIG. 6.

In block 150, a Haar template 1010 is used to refine detection of corners. Corner detection in useful because it increases confidence in both a vertical and a horizontal edge. Haar template 1010 is selected to have a shape roughly equivalent to a bottom-left corner shape and a size roughly proportional to the size of car 610 (FIG. 6). In FIG. 10, a Haar template 1010 is shown with an upper right quarter 1012 being +1 (white) and the remainder of the template 1014 being −1 (black). As with the symmetry method, intensity sums for 1012 (A) and 1014 (B) are calculated, and the difference (A−B) is computed. In some cases, a multiplier may also be used to scale intensities. The template 1020 is then moved around two-dimensionally near a bottom left corner of car 610, represented by rectangular region 1030. Differences of sums are calculated with each move, and when the difference is at a maximum, the corner has been detected. In some embodiments, the template may be inverted (−1 for 1012 and +1 for 1014) and additional processing steps may be added to corner detection to improve reliability.

Figure 5:
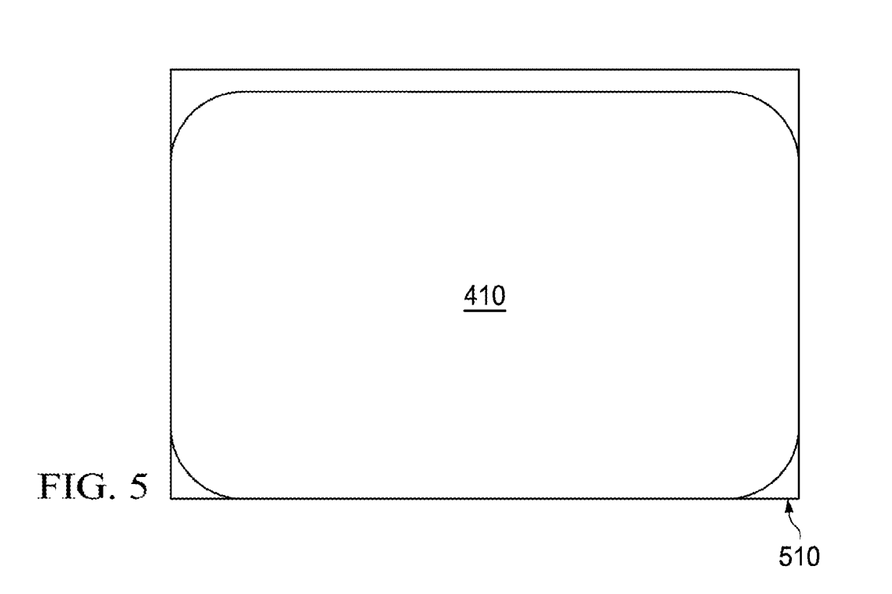
FIG. 5 is a block diagram of a generalized corner detection result.

FIG. 5 discloses a block diagram of an object 410, wherein bottom corners have been detected and a shape 510 is formed that closely matches the bottom corners of object 410. Note that shape 510 is a refinement of shape 420 (FIG. 4, 4A), which in the exemplary embodiment was previously centered on object 410 using the symmetry method of FIG. 4. Also note that only bottom edges have been reliably detected. A similar Haar template can be used to reliably locate top edges where those are of interest. However, in some exemplary road scenes, the bottom of a vehicle (being against the background of the road) may be more reliably detected than the top of the vehicle (which may be against the backdrop of things such as bill-boards, trees, poles, etc).

In the exemplary embodiment where the task is to identify a vehicle that may be a forward collision danger, defining bottom edges is a priority because a known bottom edge, along with the focal length of the camera, can be used to reliably estimate the distance to the vehicle, thus determining whether the vehicle is close enough to be a collision danger or not. Refining top edge detection is not necessary for this task, and so processor cycles are not spent doing so.

In block 154, a refined image of a vehicle located in the current image is provided based on processing done on the previous frame. In block 160, the outputs of blocks 154 and 132 are combined to form a set of possible vehicles in the current frame.

Figure 11:
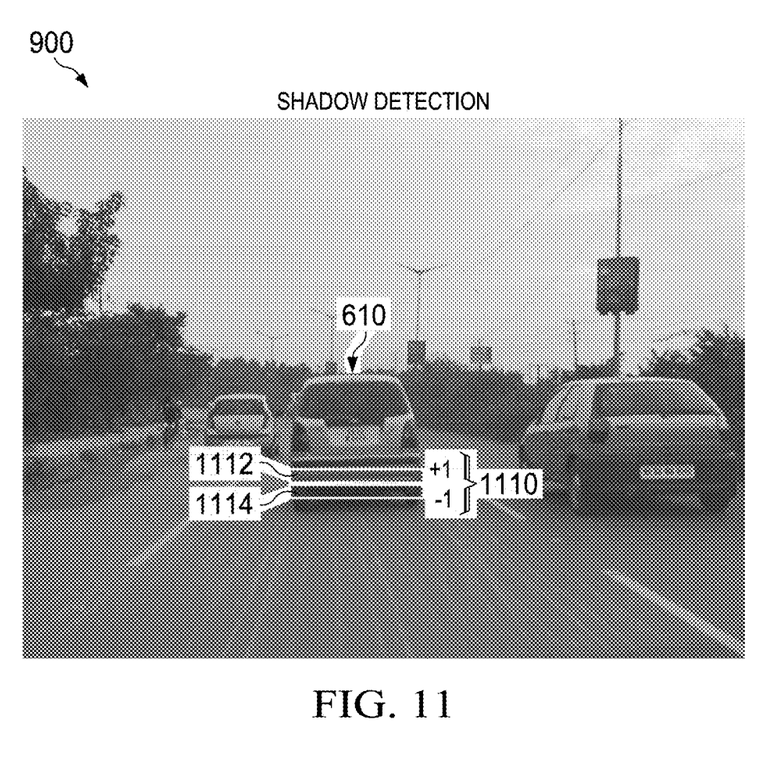
FIG. 11 is an example of shadow detection on the image of FIG. 6.

In block 170, shadow and road detection are used to refine detection of the bottom of all possible vehicles in the current frame, including for example, cars 610, 630, and 640. Accurate detection of the bottoms of vehicles is important for accurately calculating a distance to the vehicles. In this method, a Haar template 1110 is provided. Haar template 1110 has a rectangular shape roughly equal to the shape of the bottom bumper of car 610 and shadow 612, and has two regions 1112 and 1114. Haar template may also be resized to fit the feature to be matched. In this exemplary embodiment, region 1112 provides a multiplier of +1 (white), while region 1114 has a value of −1 (black). Thus, 1112 will more closely match shadow 612, while 1114 will more closely match road 620. Haar template 1110 is slid up and down and the difference between 1112 and 1114 is calculated. When that difference reaches a maximum value, meaning the greatest contrast, the bottom of car 610 has been detected more accurately. Notably, calculating of the differences is not processor intensive because the sums are all taken from the SAT of block 110.

In block 160, all candidate vehicles in the current frame, which in the exemplary embodiment include cars 610, 630, and 640, are identified. In block 180, HoG is run on those candidates, and in block 184, the candidates are classified according to SVM. With those refinements, in block 190, vehicles in the current frame are identified. Vehicles identified in block 190 may then be provided to block 140 for SAT-based analyses during the next frame.

Blocks 144, 150, and 170 may generally be referred to as SAT-based analyses, and may be provided in a discretional cascade. Because the features provide redundancy and refinement to procedures performed in the block 120 branch, the operations of 144, 150, and 170 are not necessary to a good approximation of objects in an image. Certain of these steps may be eliminated in certain embodiments if accuracy is not at a premium.

FIG. 2 is a block diagram of functional aspects of a processor carrying out the method of FIG. 1. In the exemplary embodiment, a preprocessor such as pipeline vision processor (PVP) 210 is used for Sobel edge detection block 120, RLE block 124, and SAT block 110. A PVP 210 is provided on the exemplary Blackfin BF609 DSP.

More specifically an Integral Image (IIM) block 242 calculates SAT 240. Two convolution (CNV) blocks combined with a Polar Magnitude Angle (PMA) block 238 compute Sobel edges 236. Sobel Edge 236 is provided to a Threshold, Histogram and Compression (THC) block 231, which calculates RLE plot 234.

Figure 12:
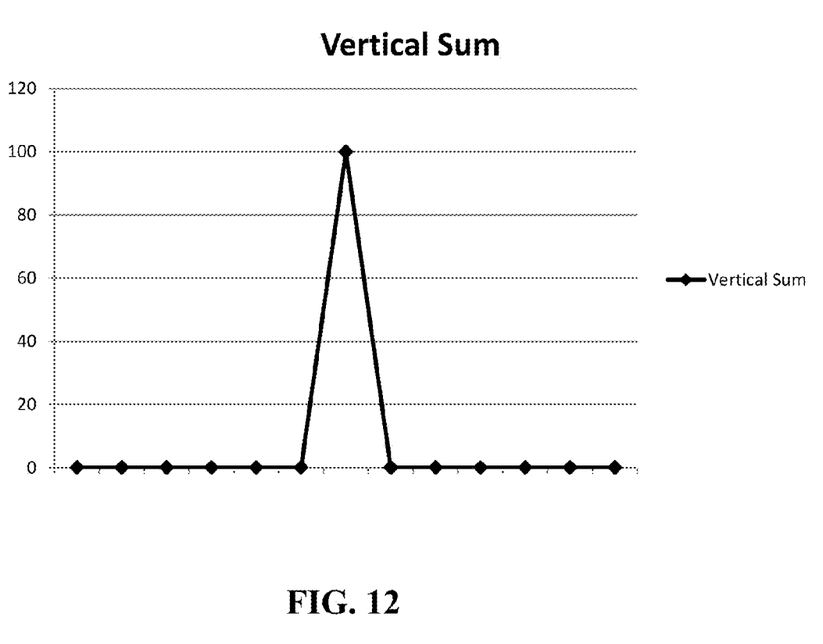
FIG. 12 is a plot of an example vertical sum.

For example, according to a method known in the prior art, edges are detected using vertical summing. Vertical sums are calculated for each column of pixels. The vertical sum is relatively low for columns of pixels where an edge is not represented and relatively high for a column of pixels where an edge is represented. In an ideal black-on-white image with a completely white field and an absolutely vertical black edge, the vertical sum function would have a characteristic of an impulse function, jumping from zero to a maximum value instantaneously, as shown in FIG. 12.

Figure 13:
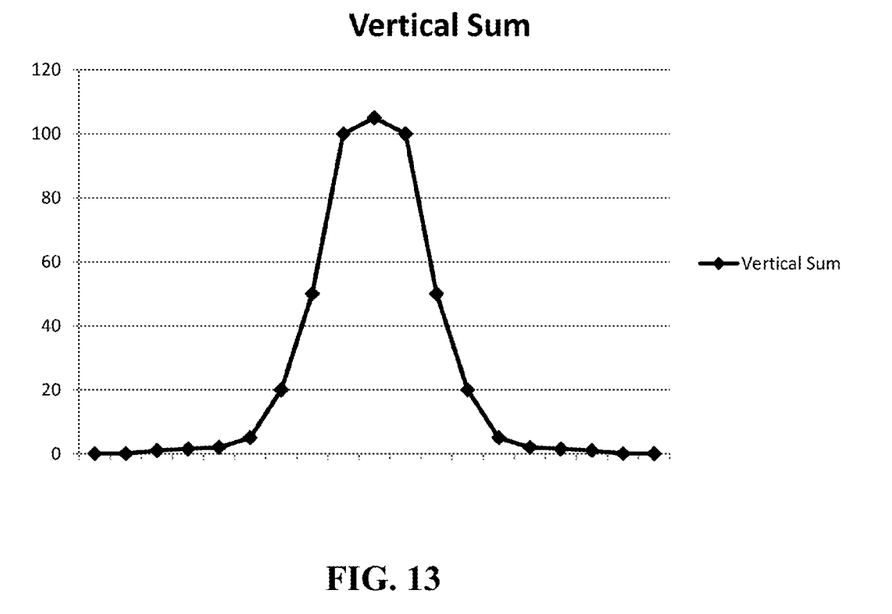
FIG. 13 is a plot of an example vertical sum.

In a real-world image with degrees of intensity and imperfect edges, the vertical sum will have an imperfect but characteristic "peak" or local maximum, with a steep rise and fall around the peak, as in FIG. 13.

Several such local maxima may appear, representing a plurality of vertical edges. For example, a vertical sum of FIG. 6 may show local maxima around the left and right edges of each of cars 610, 630, and 640.

Figure 14:
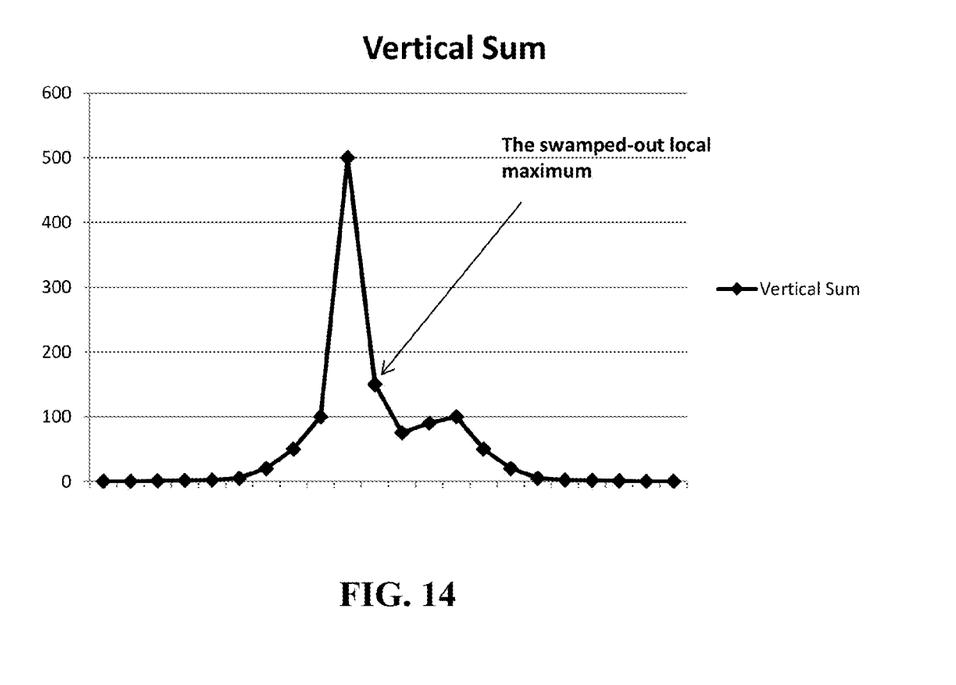
FIG. 14 is a plot of an example vertical sum.

A limitation to vertical summing is that it is susceptible to background disturbances. For example, in FIG. 6, pole 650-4 will form a very large local maximum, which may swamp out the local maximum for the left side of car 630, as seen in FIG. 14.

Because of this limitation, some embodiments of the present disclosure do not perform vertical summations, but rather rely on horizontal run lengths. In an ideal black-on-white image with perfectly-vertical edges one pixel wide, a vertical edge would be characterized by a "stack" of runs, each one-pixel wide and white, each at the exact same horizontal offset, and each with an infinitely steep gradient from white to black (or black to white) on either side. The stacks are limited by long runs of white pixels at the top and bottom, representing the top and bottom edges. Again, this idealized signature can be extrapolated to fit imperfect images, where the boundaries of a relatively rectangular object may be constructed as a "box," starting with a long run of relatively intense pixels (possibly several layers deep for an imperfect edge), and then stacks of relatively shorter runs of relatively intense pixels that partially overlap the top edge. The bottom of the box is found as a second long run of relatively intense pixels overlapping substantially with the first long run and overlapping in part with the vertical edge stacks.

In an exemplary embodiment of the present disclosure, a box constructed from RLE forms a baseline hypothesis for identifying a candidate for an object of interest such as a vehicle.

Notably, returning to pole 650-4 of FIG. 6, sitting above car 630, an RLE box may be formed around pole 650-4, but the box around the pole will be characteristically and visibly distinct from a box around car 630. Because a long, narrow box around 650 will not fit the profile of a motor vehicle, that box may be discarded without additional processing. (Pole 650-4 also visibly includes a sign posted on it. Thus, pole 650-4 may in fact be divided into two long, narrow box and one additional box closer to square. This third box may more closely fit the profile of a vehicle, and thus may be a candidate for additional processing.)

To calculate run lengths on the image, PVP 210 first receives a camera pipe 230, which is a data feed from the camera. PVP 210 then performs a Sobel operation on the image, outputting vectors representing Sobel magnitudes and angles into Sobel output 236. Sobel output 236 is provided to a memory pipe 232, which PVP 210 passes to THC 231 to perform RLE on the image. The output of this function is an RLE plot 234, which is graphically represented as RLE plot 700 (FIG. 7). RLE plot 234 is provided to a processing core 220, which selects regions of interest (ROI), which in the exemplary embodiment includes looking for box shapes in RLE plot 234.

PVP 210 provides SAT 240 and RLE Plot 234 to core 220. In block 250, core 220 selects regions of interest. In block 254, core 220 divides objects of interest into segments, as described in more detail for block 130 (FIG. 1). Core 220 then in block 260 performs corner, symmetry, and shadow detection operations on candidate objects in a prior iteration of the image using SAT 240. The operations of block 260 provide a set of candidate objects, which are provided to block 270, where HoG/SVM is performed on the candidate objects. Tracking is implemented in block 290 on all objects classified as vehicles for the current frame. If the candidate object is a potential collision danger, a warning may be generated in block 280.

Figure 3:
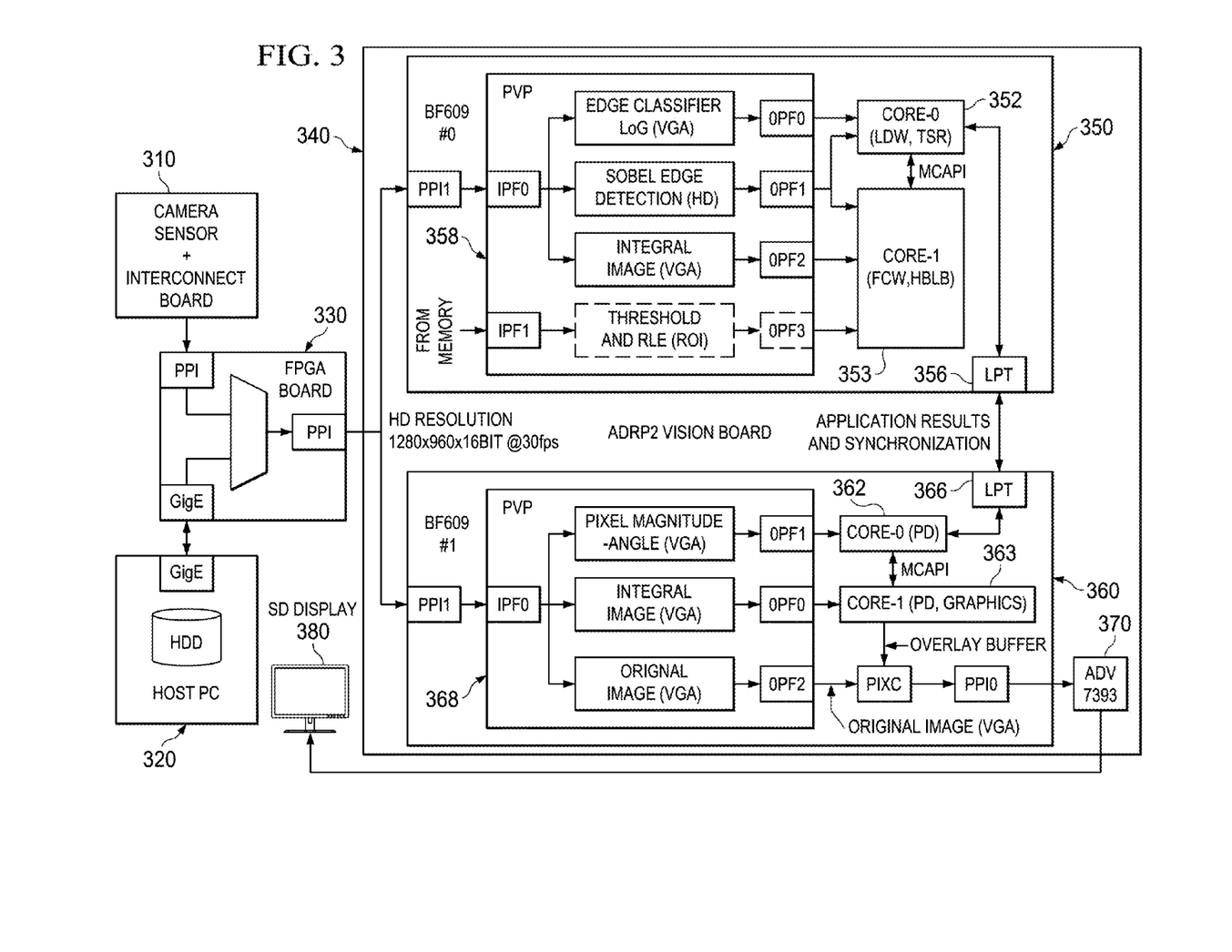
FIG. 3 is a block diagram of an exemplary embedded computer for an advanced driver assistance system providing vehicle detection.

FIG. 3 discloses an exemplary hardware architecture for performing the method of FIG. 1. In the exemplary hardware architecture, a camera 310 provides a video feed. Optionally (for example, for testing purposes) a host PC 320 may also be provided. A multiplexer board 330 mediates communications between camera 310 and host PC 320 on the one hand and an embedded motherboard 340. In this exemplary embodiment, the exemplary motherboard 340 is an Analog Devices, Inc. ADRP2 Vision Board. Motherboard 340 carries two digital signal processors 350 and 360. In this exemplary embodiment, DSPs 350 and 360 are both Analog Devices, Inc. Blackfin BF609 dual-core processors. Each BF609 is equipped with two processing cores as well as a pipeline vision processor (PVP), which is a species of video preprocessor 358, 368. The PVPs are configured to perform pre-processing, including in the exemplary embodiment, Sobel edge detection and run-length encoding, as well as generating summed area tables for images.

In the embodiment of FIG. 3, two DSPs are provided so that FCW can be performed on high-definition (HD) data at a resolution of 1280×960 pixels at 30 frames per second without compromising real-time performance. FCW is performed in addition to LDW, TSR, HBLB, and PD. If VGA-grade video is used instead, then processor 360 is unnecessary; a single processor can handle all five applications in that case.

In the two-processor configuration, core 0 352 of processor 0 350 performs LDW and TSR computations, and may communicate via LPT ports 356, 366. Core 1 353 of processor 0 performs FCW and HBLB. In this embodiment, PD is completely handled by processor 1 360. This is because PD is the most computationally-intense task. Core 0 362 of processor 1 360 is completely dedicated to PD. Core 1 363 of processor 1 360 assists in PD and also provides output graphics subroutines for testing purposes. Processor 360 therefore also provides video output to a video processor 370, such as an Analog Devices, Inc. ADV7393, which provides a video stream to monitor 380.

Implementing such features in the above sequence provides reliable vehicle detection. The present disclosure contemplates various other sequencing schemes for the discretional cascade of relevant features. For example, the shadow detection integrated with road detection could be used for robust bottom side of the vehicle detection at an earlier stage, for example, before corner detection. In another example, the top of the vehicle could be readjusted based on the horizontal edge sum, instead of the RLE.

The disclosed vehicle detection method provides numerous advantages, where it is understood that different embodiments may have different advantages and no advantage is necessarily required of any embodiment.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the functionalities may be implemented in one or more silicon cores in Application Specific Integrated Circuits (ASICs), Field Programmable Gate Arrays (FPGAs), and other semiconductor chips.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

The specifications, dimensions, and relationships outlined herein have only been offered for purposes of example and teaching only. Each of these may be varied considerably without departing from the spirit of the present disclosure, or the scope of the appended claims. The specifications apply only to non-limiting examples and, accordingly, they should be construed as such. In the foregoing description, example embodiments have been described with reference to particular component arrangements. Various modifications and changes may be made to such embodiments without departing from the scope of the appended claims. The description and drawings are, accordingly, to be regarded in an illustrative rather than a restrictive sense. Further, the operations and steps described with reference to the preceding FIGURES illustrate only some of the possible scenarios that may be executed by, or within, the various apparatuses, processors, devices, and/or systems, described herein. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

What is claimed is:

1. A method of detecting an object of interest in a first image comprising:
   receiving the first image;
   performing run-length encoding on the first image to identify edges for a shape bounding a candidate object;
   generating a hypothesis that the candidate object is the object of interest;
   calculating a histogram of gradients for the candidate object;
   classifying the candidate object as the object of interest using a support vector machine method;
   computing a summed area table for a second image, the second image containing the candidate object of the first image, the candidate object having associated with it a shape bounding the candidate object; and
   dividing the shape into discrete regions and using the summed area table to test for symmetry between regions.

2. The method of claim 1 further comprising performing a Sobel operation on the first image before performing the run-length encoding, wherein the output of the Sobel operation provides an input to the run-length encoding.

3. The method of claim 1 further comprising:
   applying a Haar template to the shape to identify at least one corner.

4. The method of claim 3 further comprising applying a Haar template to the candidate shape to identify a boundary between a shadow and the bottom of the candidate object.

5. The method of claim 1 wherein the resolution of the first image is at least 640×480 pixels.

6. The method of claim 1 wherein the first image and second image are discrete frames of a video feed providing at least 30 frames per second.

7. The method of claim 1 wherein the first image and second image are discrete frames of a video feed, wherein the first image and second image have at least 640×480 pixels and the feed provides at least 30 frames per second, and wherein the method is performed in real time.

8. The method of claim 1 wherein the object is a vehicle and wherein the object of interest is a nearest other vehicle.

9. The method of claim 8 wherein the method comprises a forward collision warning method, and further comprising performing, in parallel with the forward collision warning method, a lane drift warning method, a traffic signal recognition method, a high/beam low/beam automation method, and a pedestrian detection method.

10. The method of claim 8 wherein the method is performed as part of a forward collision warning routine.

11. The method of claim 10 wherein the method is to be performed on a computing device also configured to perform lane departure warning, traffic signal recognition, pedestrian detection, and automated high beam/low beam control.

12. A computer for detecting objects of interest comprising:
   a processor;
   a camera; and
   a memory having stored there software instructions that, when executed, are configured to instruct the processor to:
   receive a first image from the camera;
   compute a run-length encoding of the first image;
   use the run-length encoding to detect edges of a candidate object;
   receive a second image from the camera, the second image representing a previous state of the first image and including the candidate object;
   calculate a summed area table of the second image;
   use the summed area table to refine detected edges of the candidate object; and
   verify that the candidate object is the object of interest using a histogram of gradients and a support vector machine authorization.

13. The computer of claim 12 wherein computing a run-length encoding and calculating a summed area table are performed by a dedicated preprocessor.

14. The computer of claim 12 wherein the camera provides a video stream of at least 640×480 pixels and at least 30 frames per second and wherein the software instructions are to be performed in real time.

15. The computer of claim 12 wherein the camera provides a video stream of at least 1280×960 pixels and at least 30 frames per second and wherein the software instructions are performed in real time.

16. An apparatus comprising:
   an object detection engine comprising one or more logic elements, including at least one hardware logic element, operable for:
   receiving a first image;
   performing run-length encoding on the first image to identify edges for a shape bounding a candidate object;
   generating a hypothesis that the candidate object is an object of interest;

calculating a histogram of gradients for the candidate object; and classifying the candidate object as the object of interest using a support vector machine method;

computing a summed area table for a second image, the second image containing the candidate object of the first image, the candidate object having associated with it a shape bounding the candidate object; and dividing the shape into discrete regions and using the summed area table to test for symmetry between regions.

17. An advanced driver assistance system (ADAS) comprising the object detection engine of claim 16, and further comprising:

a camera configured to capture visual data from a surrounding environment and to provide a video stream having a resolution of at least 640×480 pixels at 30 frames per second; and a computer configured to receive the video stream and to process at least 30 frames per second at 640×480-pixel resolution in real time, wherein processing the stream comprises identifying a dangerously-proximate object in the video stream while consuming no more than 250 million instructions per second, comprising:

receiving a first frame comprising a first image;

performing run-length encoding on the first image to identify edges for a shape bounding a candidate object;

generating a hypothesis that the candidate object is the dangerously-proximate object;

calculating a histogram of gradients for the candidate object;

classifying the candidate object as the dangerously-proximate object using a support vector machine method;

computing a summed area table for a second frame comprising a second image, the second image containing the candidate object of the first image, the candidate object having associated with it a shape bounding the candidate object; and dividing the shape into discrete regions and using the summed area table to test for symmetry between regions.

18. The ADAS of claim 17, wherein the system is further configured to perform lane drift warning, traffic signal recognition, and automatic high beam/low beam control in real time.

19. The ADAS of claim 17, wherein the video stream provides at least 1280×960-pixel resolution, and wherein system is further configured to perform lane drift warning, traffic signal recognition, automatic high beam/low beam control, and pedestrian detection in real time, and wherein the computer includes no more than four computational cores.

* * * * *